(12) United States Patent
Numagami et al.

(10) Patent No.: US 7,440,715 B2
(45) Date of Patent: *Oct. 21, 2008

(54) ELECTROPHOTOGRAPHIC PHOTOSENSITIVE DRUM, PROCESS CARTRIDGE, AND ELECTROPHOTOGRAPHIC IMAGE FORMING APPARATUS

(75) Inventors: Atsushi Numagami, Hadano (JP); Takahito Ueno, Mishima (JP); Shigeru Hoashi, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/616,486

(22) Filed: Dec. 27, 2006

(65) Prior Publication Data
US 2007/0110478 A1 May 17, 2007

Related U.S. Application Data

(62) Division of application No. 10/960,054, filed on Oct. 8, 2004, now Pat. No. 7,209,682.

(30) Foreign Application Priority Data

May 11, 2004 (JP) ............................. 2004-140695
Sep. 29, 2004 (JP) ............................. 2004-283318

(51) Int. Cl.
*G03G 15/00* (2006.01)
(52) U.S. Cl. ...................................... 399/167; 399/117

(58) Field of Classification Search ................. 399/107, 399/110, 111, 116, 117, 159, 167
See application file for complete search history.

(56) References Cited

U.S. PATENT DOCUMENTS 5,585,889 A * 12/1996 Shishido et al. ............. 399/113
5,617,579 A 4/1997 Yashiro et al. ............... 399/114

(Continued)

FOREIGN PATENT DOCUMENTS

EP 1 195 651 4/2002

(Continued)

*Primary Examiner*—Hoan H Tran
(74) *Attorney, Agent, or Firm*—Fitzpatrick, Cella, Harper & Scinto

(57) ABSTRACT

An electrophotographic photosensitive drum is for a process cartridge detachably mountable to a main assembly of an electrophotographic image forming apparatus. The main assembly includes a motor, and a gear having a non-circular twisted hole. The drum includes a cylinder having a non-circular twisted projection engageable with the hole to receive a driving force from the main assembly when the cartridge is mounted to the main assembly. A recess is formed in the projection and has a bottom portion and a side surface portion. When the projection receives a pulling force toward the hole by rotation of the gear with the projection and the hole being engaged with each other, the bottom portion contacts a spherical surface portion provided at a central portion of the hole, and the side surface portion contacts the spherical surface portion.

11 Claims, 10 Drawing Sheets

U.S. PATENT DOCUMENTS

| | | |
|---|---|---|
| 6,029,032 A | 2/2000 | Watanabe et al. ............ 399/111 |
| 6,097,909 A | 8/2000 | Watanabe et al. ............ 399/111 |
| 6,118,960 A | 9/2000 | Nakagawa et al. ........... 399/111 |
| 6,128,454 A | 10/2000 | Kawai et al. ................. 399/116 |
| 6,169,866 B1 | 1/2001 | Watanabe et al. ............ 399/111 |
| 6,175,706 B1 | 1/2001 | Watanabe et al. ............ 399/167 |
| 6,226,478 B1 | 5/2001 | Watanabe et al. ............ 399/117 |
| 6,240,266 B1 | 5/2001 | Watanabe et al. ............ 399/117 |
| 6,246,849 B1 | 6/2001 | Yokoyama et al. ........... 399/117 |
| 6,272,299 B1 | 8/2001 | Numagami et al. .......... 399/111 |
| 6,330,409 B1 | 12/2001 | Watanabe et al. ............ 399/111 |
| 6,336,018 B1 | 1/2002 | Kawai et al. ................. 399/117 |
| 6,349,188 B1 | 2/2002 | Kawai et al. ................. 399/116 |
| 6,385,416 B1 | 5/2002 | Horikawa et al. ............ 399/111 |
| 6,400,914 B1 | 6/2002 | Noda et al. .................... 399/90 |
| 6,442,359 B1 | 8/2002 | Numagami et al. .......... 399/111 |
| 6,463,233 B2 | 10/2002 | Kojima et al. ................ 399/111 |
| 6,501,926 B1 | 12/2002 | Watanabe et al. ............ 399/117 |
| 6,501,927 B1 | 12/2002 | Watanabe et al. ............ 399/117 |
| 6,577,831 B1 | 6/2003 | Kojima et al. ................ 399/111 |
| 6,608,980 B2 | 8/2003 | Murayama et al. ........... 399/111 |
| 6,714,752 B2 | 3/2004 | Ueno et al. ................... 399/117 |
| 6,829,455 B2 | 12/2004 | Yasumoto et al. ............ 399/167 |
| 6,885,838 B2 | 4/2005 | Kawai et al. ................. 399/167 |
| 6,901,229 B2 | 5/2005 | Nishiuwatoko et al. ..... 399/167 |
| 6,934,485 B2 | 8/2005 | Miyabe et al. ................. 399/90 |
| 6,999,696 B2 | 2/2006 | Noda et al. .................... 399/90 |
| 7,003,247 B2 | 2/2006 | Koishi et al. ................. 399/167 |
| 7,092,655 B2 | 8/2006 | Noda et al. .................... 399/90 |
| 7,231,161 B2 | 6/2007 | Noda et al. .................... 399/90 |
| 7,248,814 B2 | 7/2007 | Kawai et al. ................. 399/111 |
| 7,274,896 B2 | 9/2007 | Kawai et al. ................. 399/111 |
| 2002/0018666 A1 | 2/2002 | Noda et al. .................... 399/90 |
| 2002/0044794 A1 | 4/2002 | Nishiuwatoko et al. ..... 399/167 |
| 2004/0086300 A1 | 5/2004 | Kawai et al. ................. 399/167 |
| 2005/0163526 A1 | 7/2005 | Kawai et al. ................... 399/90 |
| 2006/0008287 A1 | 1/2006 | Noda et al. .................... 399/90 |
| 2006/0198654 A1 | 9/2006 | Noda et al. .................... 399/90 |
| 2007/0104510 A1 | 5/2007 | Kawai et al. ................. 399/167 |
| 2007/0104511 A1 | 5/2007 | Kawai et al. ................. 399/167 |

FOREIGN PATENT DOCUMENTS

| | | |
|---|---|---|
| JP | 10-105022 | 4/1998 |
| JP | 10-240103 | 9/1998 |
| JP | 2000-112200 | 4/2000 |
| JP | 2002-182446 A | 6/2002 |
| JP | 2003-005475 | 1/2003 |

* cited by examiner (a) EMBODIMENT (b) PRIOR ART

ELECTROPHOTOGRAPHIC PHOTOSENSITIVE DRUM, PROCESS CARTRIDGE, AND ELECTROPHOTOGRAPHIC IMAGE FORMING APPARATUS

CROSS-REFERENCE TO RELATED APPLICATION

The present application is a Divisional Application of U.S. application Ser. No. 10/960,054 filed Oct. 8, 2004, allowed.

FIELD OF THE INVENTION AND RELATED ART

The present invention relates to an electrophotographic photosensitive drum (which hereinafter will be referred to simply as "photosensitive drum"), a process cartridge employing an electrophotographic photosensitive drum, and an electrophotographic image forming apparatus employing such a process cartridge.

Here, an electrophotographic image forming apparatus is an apparatus for forming an image on a recording medium (for example, paper, OHP sheet, etc.) with the use of an electrophotographic image forming method. For example, an electrophotographic copying machine, an electrophotographic printer (for example, an LED printer, a laser beam printer, etc.), a facsimile machine, a word processor, etc., can be included in the category of an electrophotographic image forming apparatus.

A process cartridge is a cartridge which is removably mountable in the main assembly of an electrophotographic image forming apparatus, and in which a minimum of one among a charging means as a processing means, a developing means as a processing means, a cleaning means as a processing means, and an electrophotographic photosensitive drum, are integrally placed in order to make them removably mountable in the main assembly of the image forming apparatus. It also includes a cartridge which is removably mountable in the main assembly of an electrophotographic image forming apparatus, and in which a minimum of a developing means as a processing means, and an electrophotographic photosensitive drum, are integrally placed in order to make them removably mountable in the main assembly of the image forming apparatus.

A process cartridge system has long been employed in the field of an electrophotographic image forming apparatus.

A process cartridge system makes it possible for a user to maintain an electrophotographic image forming apparatus by himself, without relying on a service person, improving substantially operational efficiency. Therefore, it is widely used in the field of an image forming apparatus.

In recent years, demand for an electrophotographic color image forming apparatus capable of forming a color image has been increasing.

An electrophotographic image forming apparatus forms four independent images different in their colors. Thus, if any of the four images deviates from a target (ideal) position on the peripheral surface of the photosensitive drum, this results in the formation of a color image with a color deviation.

A countermeasure for preventing the formation of a color image with the above-described color deviation is as follows. The main assembly of an electrophotographic color image forming apparatus is provided with a gear which receives a driving force from a motor. This gear is provided with a spiral hole, which is located in the center thereof to transmit the driving force to the photosensitive drum. One of the lengthwise ends of the photosensitive drum is provided with a spiral projection, which fits into the spiral hole on the main assembly side to transmit the driving force. With the provision of this structural arrangement, the driving force from the motor on the main assembly side is transmitted to the photosensitive drum through the wall of the spiral hole on the main assembly side, and the spiral projection on the photosensitive drum side, precisely rotating the photosensitive drum (Japanese Laid-open Patent Application 2003-5475).

In other words, the above-described structural arrangement raises the level of accuracy at which the photosensitive drum is rotated.

SUMMARY OF THE INVENTION

The present invention is a further development of the above described prior art.

The primary object of the present invention is to provide a combination of a photosensitive drum, a process cartridge, and an electrophotographic image forming apparatus, which is superior to that of the prior art, in terms of the level of accuracy at which a photosensitive drum is rotated.

Another object of the present invention is to provide a combination of a photosensitive drum, a process cartridge, and an electrophotographic image forming apparatus, which prevents the photosensitive drum from fluctuating in rotational velocity.

Another object of the present invention is to provide a combination of a photosensitive drum, a process cartridge, and an electrophotographic image forming apparatus, which precisely positions the photosensitive drum relative to the main assembly of the image forming apparatus by placing the hemispherical portion of the drive shaft on the main assembly side of the image forming apparatus, in contact with the bottom of the hole of the projection on the photosensitive drum side, in terms of the lengthwise direction of the photosensitive drum, and by placing the base portion of the hemispherical portion in contact with the lateral surface of the hole, in terms of the direction perpendicular to the lengthwise direction of the photosensitive drum.

Another object of the present invention is to provide a combination of a photosensitive drum, a process cartridge, and an electrophotographic image forming apparatus, which is superior in image quality to that of the prior art.

Another object of the present invention is to provide a combination of a photosensitive drum a process cartridge, and an electrophotographic image forming apparatus, which prevents the photosensitive drum from fluctuating in rotational velocity even if the axial line of the driving gear on the main assembly side of the image forming apparatus becomes tilted relative to the axial line of the photosensitive drum.

Another object of the present invention is to provide a combination of a photosensitive drum, a process cartridge, and an electrophotographic image forming apparatus, which minimizes the fluctuation of the rotational velocity of the photosensitive drum in order to minimize the color deviation to form a high quality image.

According to an aspect of the present invention, there is provided an electrophotographic photosensitive drum for a process cartridge detachably mountable to a main assembly of an electrophotographic image forming apparatus for forming an image on a recording material. The main assembly includes a motor, a main assembly gear for transmitting a driving force from the motor, and a non-circular twisted hole having a section with a plurality of corner portions provided at a central portion of the main assembly gear. The non-circular twisted hole is rotatable integrally with the main assembly gear. The electrophotographic photosensitive drum comprises (a) a cylinder having a photosensitive layer on a peripheral surface thereof; and (b) a non-circular twisted projection provided on one longitudinal end of the cylinder and having a section with a plurality of corner portions. The non-circular twisted projection is engageable with the hole of the main assembly of the apparatus to receive a driving force from the main assembly of the apparatus when the process cartridge is mounted to the main assembly of the apparatus. A recess is formed in a central portion of the projection and has a bottom portion and a side surface portion. When the projection receives a pulling force toward the hole by rotation of the main assembly gear with the projection and the hole being engaged with each other, the bottom portion contacts a spherical surface portion provided at a central portion of the hole, and the side surface portion contacts the spherical surface portion. When the electrophotographic photosensitive drum is mounted to the main assembly of the apparatus, and the electrophotographic photosensitive drum receives a driving force for rotation from the main assembly of the apparatus, an end of the spherical surface portion contacts the bottom portion, and the spherical surface portion contacts the side surface portion.

The present invention can improve a photosensitive drum in the level of accuracy at which it is rotated.

The present invention can prevent a photosensitive drum from fluctuating in rotational velocity.

According to the present invention, the photosensitive drum is precisely positioned relative to the main assembly of the image forming apparatus by placing the hemispherical portion of the drive shaft on the main assembly side of the image forming apparatus, in contact with the bottom of the hole of the projection on the photosensitive drum side, in terms of the lengthwise direction of the photosensitive drum, and by placing the base portion f the hemispherical portion in contact with the lateral surface of the hole, in terms of a direction perpendicular to the lengthwise direction of the photosensitive drum.

The present invention can improve the quality of images formed by an electrophotographic image forming apparatus.

The present invention can prevent a fluctuation in the rotational velocity of the photosensitive drum even if the axial line of the gear on the main assembly side of an image forming apparatus becomes tilted relative to the axial line of the photosensitive drum.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Hereinafter, the combination of the electrophotographic photosensitive drum, the process cartridge, and the electrophotographic image forming apparatus, in one of the preferred embodiments of the present invention, will be described with reference to the appended drawings.

In the following description of the preferred embodiment of the present invention, an image forming apparatus is described as an electrophotographic full-color image forming apparatus employing four process cartridges removably mountable in the main assembly of the image forming apparatus. However, this embodiment is not intended to limit the number of the process cartridges to be removably mounted in an image forming apparatus; in other words, the number of the process cartridges to be removably mounted in an image forming apparatus is optional, and may be determined according to the requirements of use. For example, in the case of an image forming apparatus for forming a monochromatic image, the number of the cartridges mounted in the main assembly of the apparatus is one. Also in the following description of the preferred embodiment of the present invention, the image forming apparatus is described as a printer, which is one form of an image forming apparatus. However, this embodiment is not intended to limit the application of the present invention to a printer. In other words, the present invention is also applicable to image forming apparatuses other than a printer, for example, a copying machine, a facsimile machine, or a machine (multifunction image forming apparatus) capable of performing one or more functions of the preceding image forming apparatuses. Moreover, the application of the present invention is not limited to an image forming apparatus employing an electrostatic transfer belt. That is, the present invention is also applicable to an image forming apparatus which employs an intermediary transferring member, and in which a plurality of developer images different in color are sequentially transferred in layers onto the intermediary transferring member, and then, are transferred all at once onto a recording medium.

Further, the materials and configurations of the structural components in the following embodiment of the present invention, and their positional relationship, are optional, and are to be changed as necessary according to the structure of an apparatus to which the present invention is applied, and various other factors. In other words, the following embodiment of the present invention is not intended to limit the scope of the present invention.

[General Structure of Full-color Image Forming Apparatus]

Figure 1:
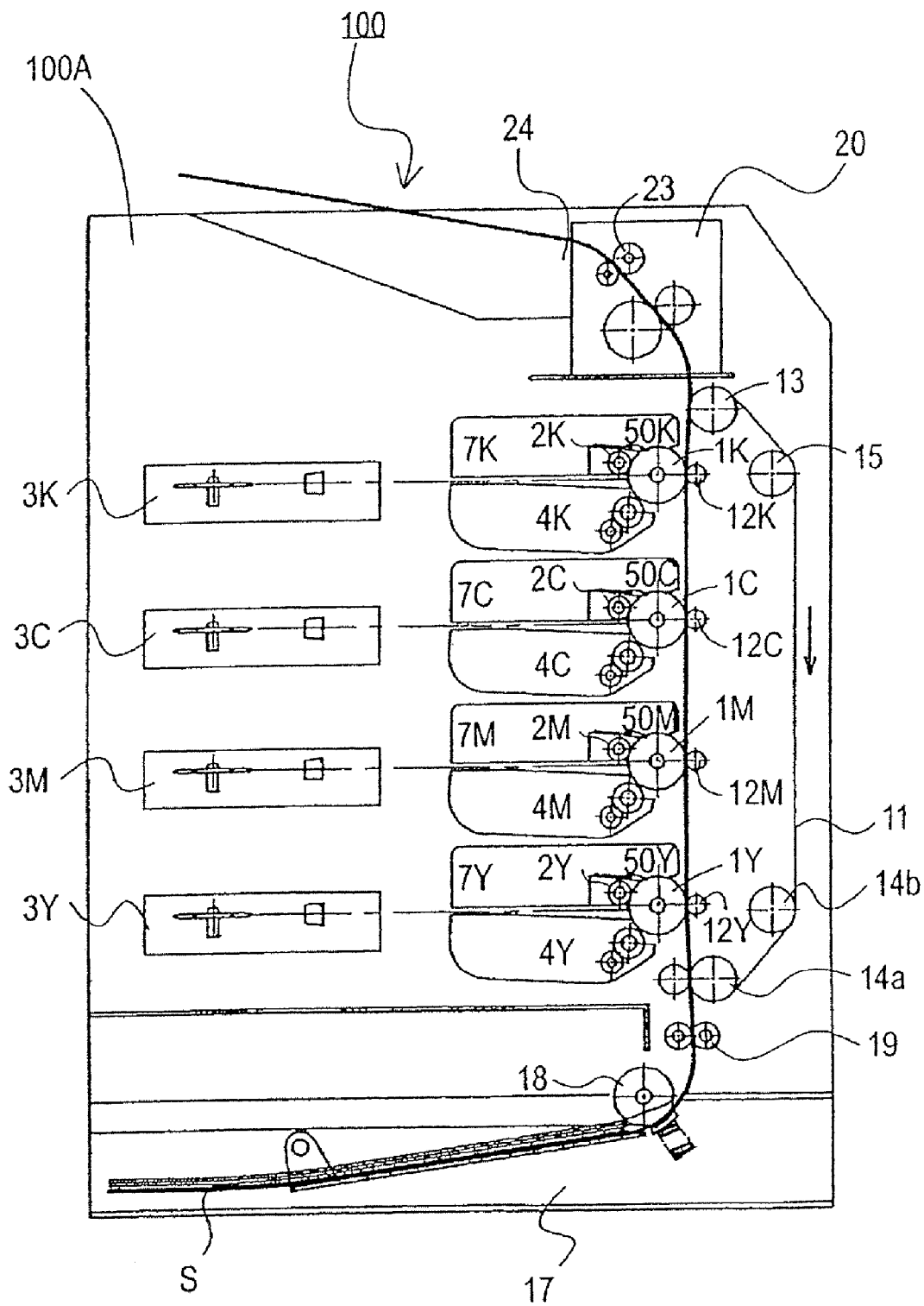
FIG. 1 is a sectional view of the color image forming apparatus in one of the preferred embodiments of the present invention.

First, referring to FIG. 1, an electrophotographic full-color image forming apparatus in accordance with the present invention will be described. FIG. 1 is a vertical sectional view of a full-color laser beam printer, which is one form of an image forming apparatus, showing the general structure thereof.

As shown in FIG. 1, the image forming apparatus 100 in accordance with the present invention employs four process cartridges 7, one for each of the four color components, that is, yellow (7Y), magenta (7M), cyan (7C), and black (7K), and a conveying means for conveying a recording medium to the four process cartridges 7 and discharges the recording medium out of the main assembly of the image forming apparatus. Each of the four cartridges 7 comprises an electrophotographic photosensitive drum (which hereinafter will be referred to simply as "photosensitive drum") 1 which is rotated at a predetermined peripheral velocity.

Each cartridge 7 comprises a photosensitive drum 1 (1Y, 1M, 1C, and 1K) which is rotationally driven, a charge roller 2 (2Y, 2M, 2C, and 2K) for uniformly charging the peripheral surface of the photosensitive drum 1, a development unit 4 (4Y, 4M, 4C, and 4K) having a development roller 40 as a developing means for developing an electrostatic latent image formed on the photosensitive drum 1, by adhering developer to the electrostatic latent image, a cleaner unit 50 (50Y, 50M, 50C, and 50K) having a cleaning blade 60 as a cleaning means for removing the residual developer, that is, the developer remaining on the peripheral surface of the photosensitive drum 1 after the image transfer. The charge roller 2, development unit 4, and cleaner unit 50 are placed in the adjacencies of the peripheral surface of the photosensitive drum 1. The main assembly of the image forming apparatus is provided with a plurality of scanner units (3Y, 3M, 3C, and 3K) for forming an electrostatic latent image on the peripheral surface of the photosensitive drum 1.

The image formation process of this image forming apparatus is as follows: First, the peripheral surface of the photosensitive drum 1 is uniformly charged by the charge roller 2 as a charging means. Then, the uniformly charged peripheral surface of the photosensitive drum 1 is exposed to a beam of laser light projected by the scanner unit while being modulated with video signals, forming thereby an electrostatic latent image on the peripheral surface of the photosensitive drum 1. This electrostatic latent image is developed by the developing means (development roller 40) of the development unit 4, which uses developer.

The conveying means for conveying a recording medium to the cartridge 7 has the following structure. In a cassette 17 located in the bottom portion of the apparatus main assembly 100A, a plurality of recording media S are stored. The recording media S are fed out of the cassette 17 by a feed roller 18 while being separated one by one, and are sent to a pair of registration rollers 19. Then, each recording medium S is conveyed by the pair of registration roller 19 to an electrostatic transfer belt 11 in synchronism with the progression of an image forming operation. Then, the recording medium S is conveyed by the electrostatic transfer belt 11 sequentially along the four cartridges 7. The transfer belt 11 is stretched around, and suspended by, the rollers 13, 14a, 14b, and 15, and is circularly driven. The transfer belt 11 keeps the recording medium S electrostatically adhered thereto, and conveys the recording medium S through the location, in which the recording medium S is placed in contact with the peripheral surface of the photosensitive drum 1.

In this embodiment, the conveying means is made up of the feed roller 18, the pair of registration rollers 19, the electrostatic transfer belt 11, and the pair of discharge rollers 23. The discharge rollers 23 will be described later.

Within the loop formed by the transfer belt 11, four transfer rollers (12Y, 12M, 12C, and 12K) are placed in parallel in the positions in which they oppose the four photosensitive drums 1 (1Y, 1M, 1C, and 1K), respectively, and contact the transfer belt 11. In these positions, the developer images, which are formed on the peripheral surfaces of the photosensitive drums 1, one for one, and are different in color, are sequentially transferred in layers by the application of transfer bias to the transfer rollers 12, onto the recording medium S, while the recording medium S is conveyed by the transfer belt 11. As a result, a color developer image is formed on the recording medium S.

After the formation of the color developer image on the recording medium S, the recording medium S is conveyed to a fixing station 20 in which the next step is carried out. In the fixing station 20, the color developer image is fixed to the recording medium S by the application of heat and pressure. Thereafter, the recording medium S is discharged by the pair of discharge rollers 23 into a delivery station 24 located on top of the apparatus main assembly.

[Structure of Process Cartridge]

Next, referring to FIGS. 3 and 4, the general structure of the cartridge 7 will be described. In this embodiment, the cartridge 7Y having yellow developer, the cartridge 7M having magenta developer, the cartridge 7C having cyan developer, and the cartridge 7K having black developer are identical in structure. Each cartridge 7 has the photosensitive drum 1, and one or more processing means, which are a charging means (processing means), developing means (processing means), and cleaning means (processing means). The processing means are placed in the adjacencies of the peripheral surface of the photosensitive drum 1.

The photosensitive drum 1 comprises a cylindrical substrate 63, for example, an aluminum cylinder, and a photosensitive layer coated on the peripheral surface of the aluminum cylinder 63. The photosensitive drum 1 is rotatably supported by the pair of shafts attached to the lengthwise ends of the aluminum cylinder 63. To one of the lengthwise ends of the photosensitive drum 1, the driving force from a motor is transmitted, rotating the photosensitive drum 1 (in counterclockwise direction).

The charging means is for uniformly charging the peripheral surface of the photosensitive drum 1. In this embodiment, a charge roller 2, which is electrically conductive, is employed as the charging means. The charge roller 2 is kept in contact with the peripheral surface of the photosensitive drum 1 by a pressure generating means, such as a pair of springs. As a charge bias is applied to the charge roller 2, the peripheral surface of the photosensitive drum 1 is uniformly charged by the charge roller 2.

Figure 2:
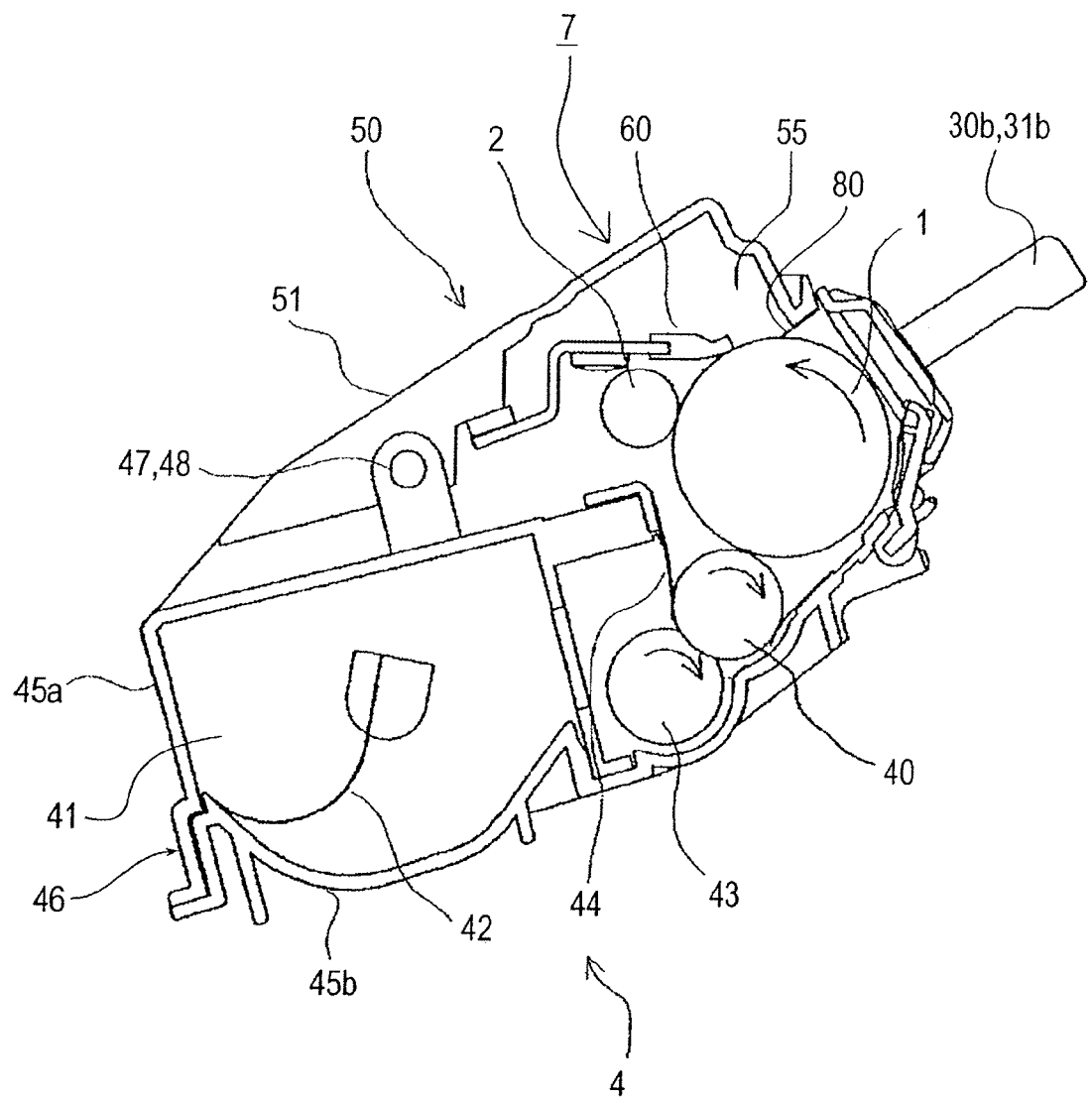
FIG. 2 is a sectional view of the process cartridge in the preferred embodiment of the present invention.

The developing means, which uses developer, is for developing an electrostatic latent image formed on the peripheral surface of the photosensitive drum 1. To describe the structure of the developing means, it comprises a developer container (developer storage portion) 41 in which developer is contained, and from which the developer is sent to a developer supply roller 43 by a developer sending mechanism 42 located within the developer container 41. The developer supply roller 43 is rotated in the clockwise direction (FIG. 2). It supplies the development roller 40 with the developer, and also, strips the developer from the development roller 40 after the development. The developer supplied to the development roller 40 is evenly coated, while being given electric charge, on the peripheral surface of the development roller 40 by a development blade 44 kept pressured against the peripheral surface of the development roller 40. As a development bias is applied to the development roller 40 from the apparatus main assembly 100A, the development roller 40 develops the latent image; it adheres the developer to the latent image. The development roller 40 is positioned in parallel to the photosensitive drum 1, and is rotated in the clockwise direction indicated by an arrow mark in FIG. 2.

The developer container 41, the developer supply roller 43, the development roller 40, and the development blade 44 belong to the development unit 4.

The cleaning means is for removing the developer remaining on the peripheral surface of the photosensitive drum 1 after the developer image is transferred from the photosensitive drum 1. The cleaning blade 60, as the cleaning means, belongs to the cleaner unit 50. In other words, the cleaner unit 50 comprises the cleaning blade 60 for removing the developer remaining on the peripheral surface of the photosensitive drum 1, a removed developer storage chamber (removed developer storing portion) 55 for storing the developer removed from the peripheral surface of the photosensitive drum 1 by the cleaning blade 60, and a flexible sheet 80 for preventing the developer removed by the blade 60 from leaking from the cleaner unit frame 51. The sheet 80 is positioned so that a small amount of contact pressure is generated between its tip and peripheral surface of the photosensitive drum 1.

The unit 50 also comprises the photosensitive drum 1 and the charge roller 2, in addition to the cleaning means, and is connected to the development unit 4 so that the two units 50 and 4 are rotatable relative to each other. In other words, the cartridge 7 is made up of the cleaner unit 50 and development unit 4.

To describe the invention in detail, the photosensitive drum 1 is rotatably attached to a frame 51 of the cleaner unit 50, with a pair of bearings 30 and 31 placed between the photosensitive drum 1 and frame 51. Further, the charge roller 2, the cleaning blade 60, and the sheet 80 are placed in contact with the photosensitive drum 1, as described before. Further, the removed developer storage chamber 55 is a part of the cleaner unit 50.

The development unit 4 has a frame 46 formed by joining two separate frames 45a and 45b by ultrasonic welding. To this development unit frame 46, the development roller 40, the developer container 41, the developer supply roller 43, and the development blade 44 are attached.

The development unit 4 is connected to the cleaner unit 50 in the following manner. First, the two units 4 and 50 are positioned so that connective holes 47 and 48 of the development unit 4, located at the lengthwise ends of the development unit frame 46, align with supportive holes 52 and 53 of the cleaner unit 50, located at the lengthwise ends of the cleaning unit frame 51, respectively. Then, a pair of pins (unshown) are inserted through the holes 47 and 52, and holes 48 and 53, from outside the lengthwise ends of cleaner unit frame 51. As a result, the development unit 4 is connected to the cleaner unit 50 so that it is rotatable relative to the cleaner unit 50.

The development unit 4 is kept under the pressure generated by a pair of springs (unshown), or the like elastic members, toward the cleaner unit 50, in order to keep a pair of spacer rings (unshown) fitted around the development roller 40, pressed upon the peripheral surface of the photosensitive drum 1. The pair of springs (unshown) are attached to the lengthwise ends of the unit 50, one for one.

[Structure for Mounting Process Cartridge into Main Assembly of Image Forming Apparatus or Removing it therefrom]

Figure 3A:
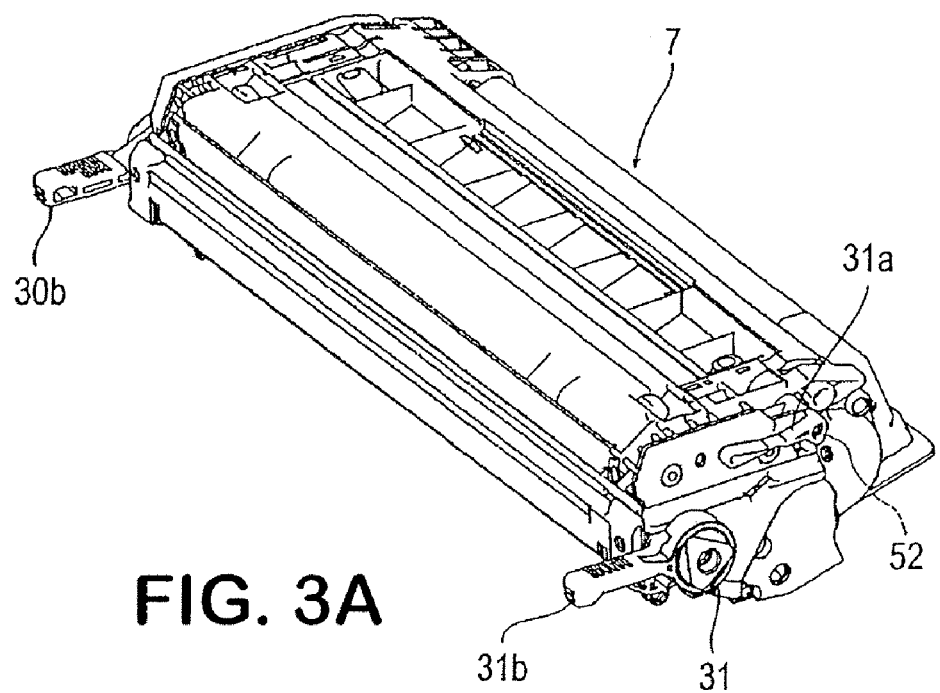
FIGS. 3A and 3B are perspective views of the process cartridge in the preferred embodiment of the present invention.
Figure 3B:
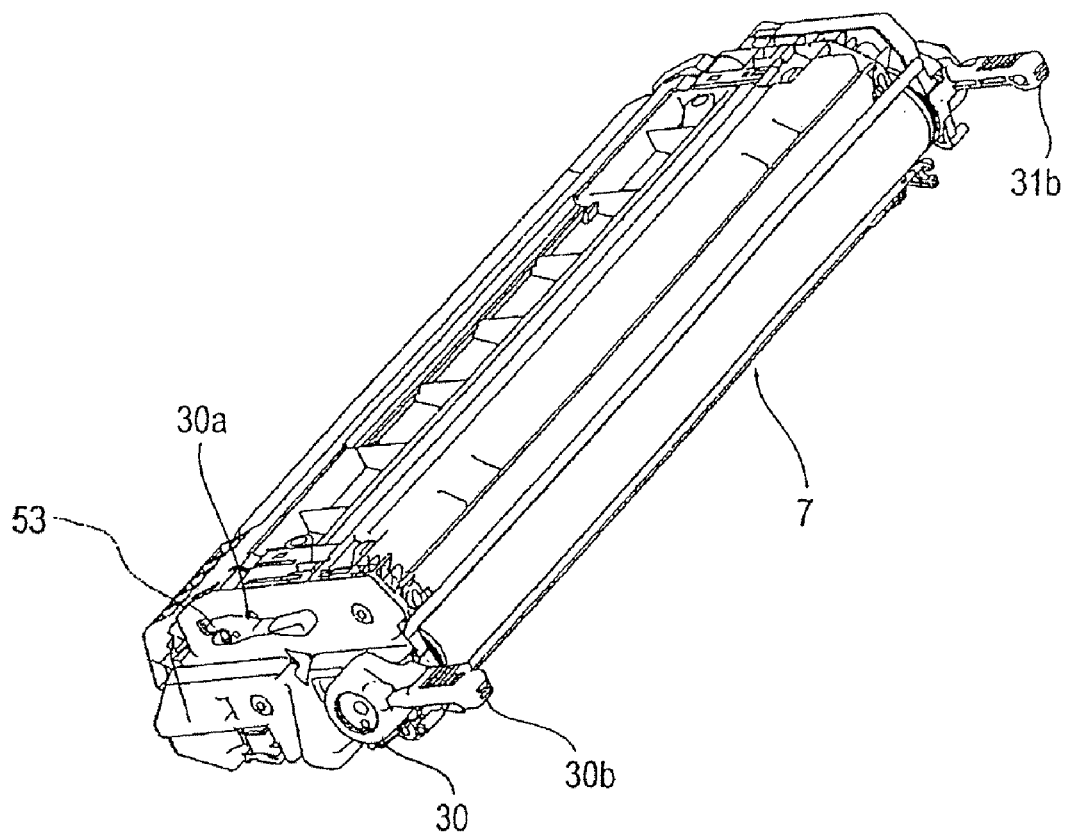

Next, referring to FIGS. 3(a), 3(b) and 4, the structure of the means for removably mounting the cartridge 7 into the main assembly 100A of the image forming apparatus 100 will be described.

Figure 4:
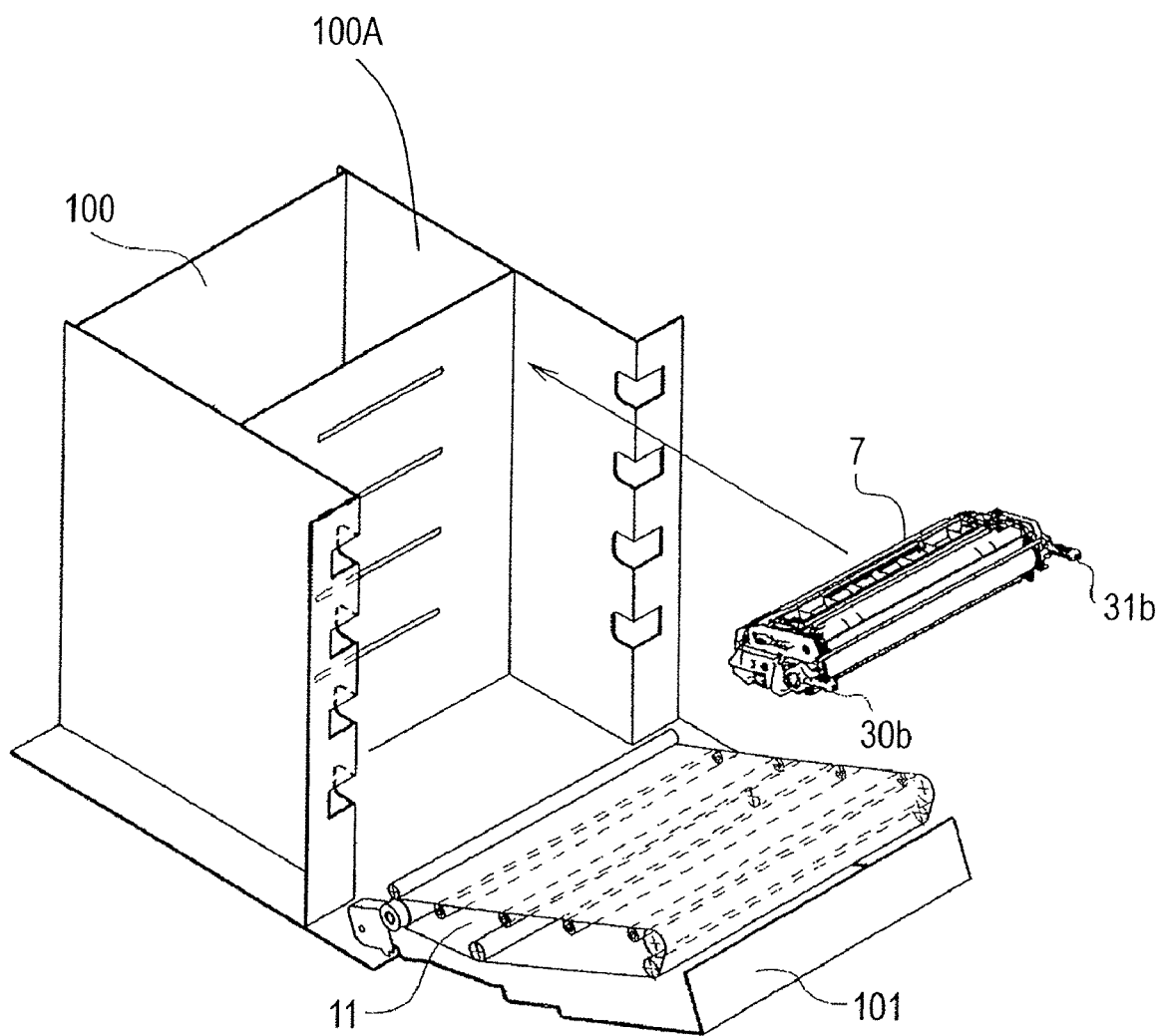
FIG. 4 is a schematic perspective view of the main assembly of the image forming apparatus and process cartridge, showing how the process cartridge is mounted into the apparatus main assembly.

Referring to FIG. 4, the image forming apparatus main assembly 100A is provided with a front cover 101, which is hinged to the main assembly 100A. The aforementioned transfer belt 11 is attached to the inward side of the front cover 101. In other words, the front cover 101 and transfer belt 11 are attached to the apparatus main assembly 100A so that they can be opened or closed against the apparatus main assembly 100A. When the front cover 100 and transfer belt 11 are open, the cartridge 7 can be removably mounted into the main assembly 100A. The aforementioned transfer belt 11 is attached to the inward side of the front cover 101. In other words, the front cover 101 and transfer belt 11 are attached to the apparatus main assembly 100A so that they can be opened or closed against the apparatus main assembly 100A. When the front cover 100 and transfer belt 11 are open, the cartridge 7 can be removably mounted into the main assembly 100A.

Referring to FIG. 3, the cartridge 7 is provided with a pair of guiding portions 30a and 31a, which are located at the lengthwise ends of the cartridge 7 to guide the cartridge 7 when mounting the cartridge 7 into the apparatus main assembly 100A or removing it therefrom. The cartridge 7 is also provided with a pair of handles 30b and 31b, which are located at the lengthwise ends of the cartridge 7.

As for the apparatus main assembly 100A, it is provided with a pair of guide rails (unshown) for guiding the guiding portions 30a and 31a of the cartridge 7.

When mounting the cartridge 7 into the apparatus main assembly 100A, the cartridge 7 is to be inserted into the apparatus main assembly 100A so that the guiding portions 30a and 31a follow the guide rails of the apparatus main assembly 100A. This makes it possible to properly mount the cartridge 7 into the apparatus main assembly 100A. When taking the cartridge 7 out of the apparatus main assembly 100A, the cartridge 7 is to be pulled outward so that the guiding portions 30a and 31a follow the guide rails of the apparatus main assembly 100A. This makes it easier to remove the cartridge 7 from the apparatus main assembly 100A. In other words, the provision of the guiding portions 30a and 31a and the guiding rails makes it easier to mount or dismount the cartridge 7.

[Structure for Precisely Positioning Photosensitive Drum relative to Main Assembly of Image Forming Apparatus]

Next, referring to FIGS. 5-8, the structure for precisely positioning the photosensitive drum 1 relative to the main assembly 100A of the image forming apparatus will be described.

The main assembly 100A of the image forming apparatus is provided with a driving force transmitting mechanism for transmitting a driving force to the photosensitive drum 1.

Figure 5:
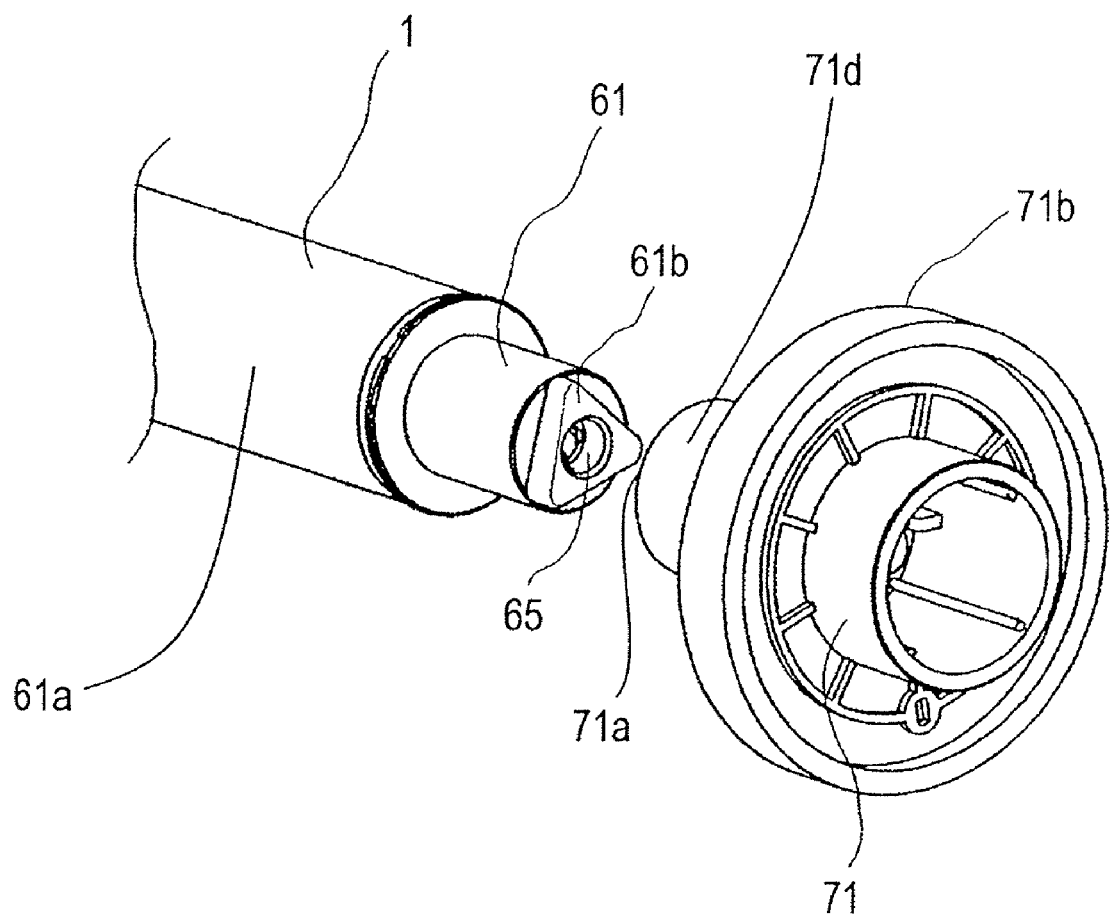
FIG. 5 is a perspective view of the drum flange.
Figure 6:
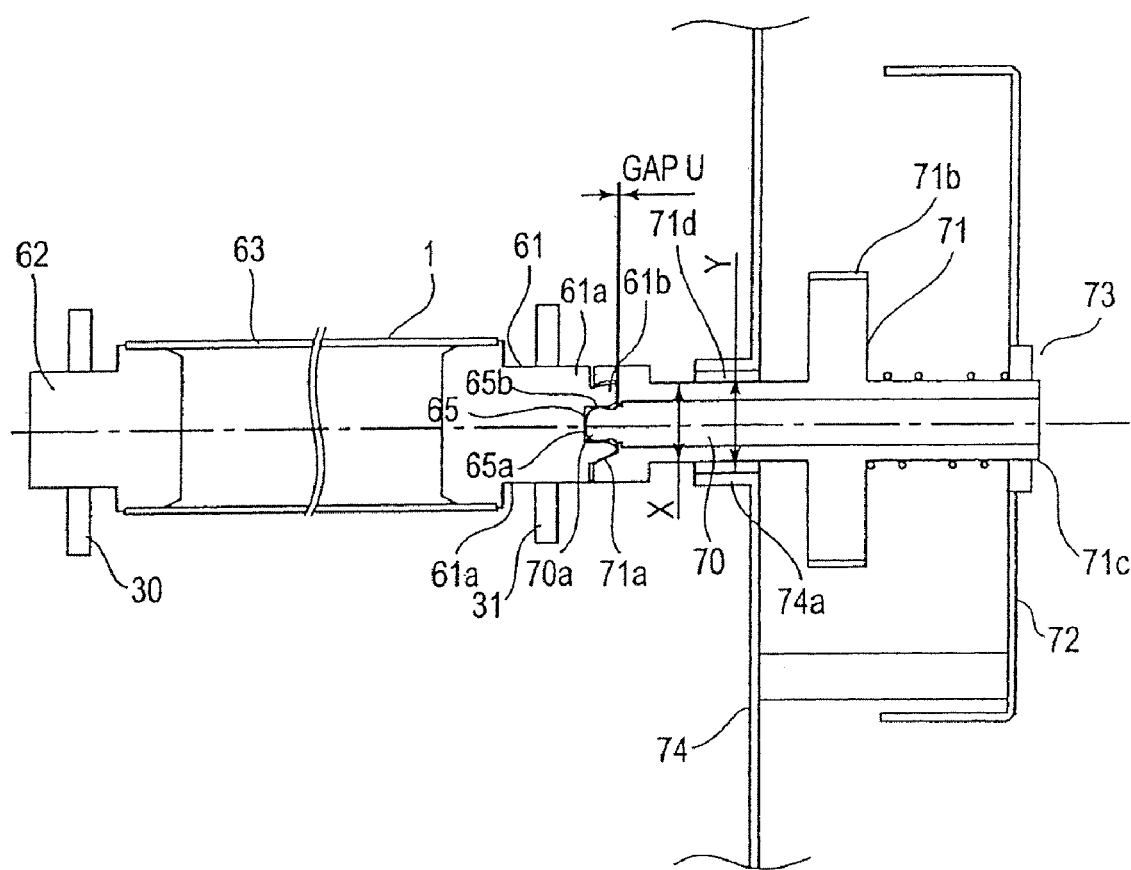
FIG. 6 is a sectional view of the drum driving force transmission mechanism in the preferred embodiment of the present invention.
Figure 9:
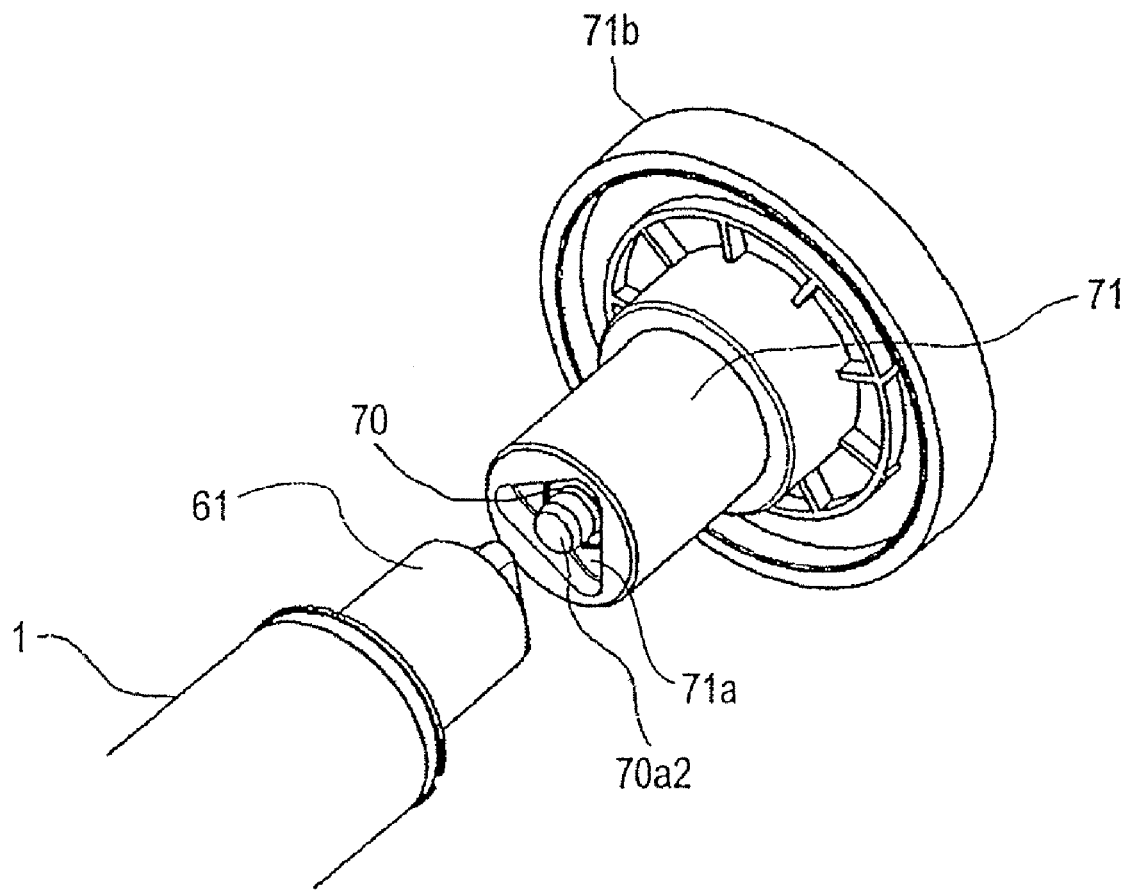
FIG. 9 is a perspective view of the drum driving force transmission mechanism in the preferred embodiment of the present invention.

Referring to FIGS. 5, 6, and 9, this diving force transmission mechanism of the apparatus main assembly 100A comprises a motor (unshown), and a driving gear 71 with which the apparatus main assembly 100A is provided to transmit the driving force from the aforementioned motor. The driving gear 71 has a shaft portion 71d, which projects from the center of the driving gear 71. This shaft portion 71d has a non-circular spiral hole 71a, the cross section (perpendicular to its axial direction) of which has a plurality of apexes. The transmission mechanism also comprises a drive shaft 70, which is put through the center portion of the driving gear 71, and which projects from the center of the bottom wall of the spiral hole 71a of the shaft portion 71d; in other words, the drive shaft 70 is put through the shaft portion 71d. The end of the drive shaft 70, on the shaft portion side, is made hemispheric, forming a hemispherical portion 70a. The hemispherical portion 70a is positioned so that its center coincides with the axial line of the spiral hole 71a, and slightly protrudes outward beyond the edge (end surface) of the spiral hole 71a.

Next, the driving force receiving mechanism with which the cartridge 7 is provided will be described.

Referring to FIG. 6, the photosensitive drum 1 is provided with a pair of flanges 61 and 62, which are attached, one for one, to the lengthwise ends of the cylinder 63, the peripheral surface of which is coated with the photosensitive layer. The flange 61 is provided with a shaft portion 61a, which is located at the outward end of the flange 61, and by which the photosensitive drum 1 is rotatably supported by a bearing 31 (FIG. 3), whereas the flange 62 is provided with a shaft portion, which is located at the outward end of the flange 62, and by which the photosensitive drum 1 is rotatably supported by a bearing 30. Next, referring to FIG. 5, the shaft portion 61a is provided with a non-circular spiral projection 61b, as a portion for receiving the driving force from the main assembly 100A of the image forming apparatus, the cross section of which has a plurality of apexes. As the cartridge 7 is mounted into the apparatus main assembly 100A, this projection 61b fits into the aforementioned spiral hole 71a, and receives from the apparatus main assembly 100A the driving force for rotating the photosensitive drum 1. To describe this structure in more detail, the driving gear 71 is rotated, with the projection 61b positioned in the spiral hole 71a. Therefore, the rotational force from the driving gear 71 is transmitted to the photosensitive drum 1 through the projection 61b, while the projection 61b remains subjected to the force generated in a direction to draw the projection 61b into the hole 71a, at the interface between the projection 61b and the wall of the spiral hole 71a. at the end surface of the projection 61b, on the main assembly side. This hole 65 has: the bottom 65a (bottom surface) which comes into contact with the tip (peak) 70a2 of the hemispherical portion 70a of the of the drive shaft 70, which protrudes beyond the edge of the spiral hole 71a; and the lateral surface 65b, which comes into contact with the base portion 70a1 of the hemispherical portion 70a of the drive shaft 70. In other words, as the projection 61b having entered the spiral hole 71a receives from the apparatus main assembly 100A the driving force for rotating the photosensitive drum 1, the bottom 65a of the hole 65 of the projection 61b comes into contact with the tip (peak) 70a2 of the hemispherical portion 70a of the drive shaft 70, and the lateral surface 65b of the hole 65 of the projection 61b comes into contact with the base portion 70a1 of the hemispherical portion 70a of the drive shaft 70. In this embodiment, the lateral wall 65b is made roughly perpendicular to the bottom 65a. To describe this structure in more detail, first, the projection 61b enters the hole 71a, and then, the tip (peak) 70a2 of the hemispherical portion 70a comes into contact with the bottom 65a (contact point 65a1 in FIG. 7). The tip (peak) 70a2 comes into contact with the bottom 65a in such a manner that after the contact between the tip (peak) 70a2 and bottom 60a, it virtually coincides with the axial line of the photosensitive drum 1. Further, the base portion 70a1 of the hemispherical portion 70a comes into contact with the lateral surface 65b (contact point 61a2 in FIG. 7) in such a manner that the rotational axis of the base portion 70a1 virtually coincides with the axial line of the photosensitive drum 1. Thus, as the driving gear 71 is rotated, the rotational force from the driving gear 71 is transmitted to the photosensitive drum 1 through the interface between the wall of the spiral hole 71a and the projection 61b, while the projection 61b remains subjected to the force (thrust) generated in a direction to draw the projection 61b into the spiral hole 71a at the interface. As a result, the hemispherical portion 70a is drawn deeper into the hole 65, and the tip (peak) 70a2 of the hemispherical portion 70a is placed in contact with the bottom 65a by the above described projection drawing force (thrust), ensuring that the tip (peak) 70a2 comes into contact with the bottom 65a, and the base portion 70a1 comes into contact with the lateral surface 65b. The cross section of the hole 65 perpendicular to the axial line of the flange 61 is circular. In other words, the hole 65 is cylindrical the internal diameter of the hole 65 and the external diameter of the hemispherical portion 70a are made roughly the same, allowing therefore the hemispherical portion 70a to enter the hole 65. The reason why the two diameters are roughly the same, that is, the external diameter of the hemispherical portion 70a is made slightly smaller than the internal diameter of the hole 65, is to take the manufacturing tolerances into consideration, in order to ensure that the hemispherical portion 70a is allowed to enter the hole 65. The hole 65 is positioned so that its axial line coincides with the axial line of the photosensitive drum 1, and the base portion 70a1 of the hemispherical portion 70a contacts the lateral surface 65b of the hole 65 so that the axial line of the base portion 70a1 coincides with that of the photosensitive drum 1. Further, the tip (peak) 70a2 of the hemispherical portion 70a contacts the flat bottom 65a of the hole 65.

The tip (peak) 70a2 of the hemispherical portion 70a is placed in contact with the bottom 65a of the hole 65 in the lengthwise direction of the photosensitive drum 1, that is, the axial direction (thrust direction). As a result, the position of the photosensitive drum 1 relative to the apparatus main assembly 100A in terms of the lengthwise (thrust) direction of the photosensitive drum 1 is fixed. Further, the base portion 70a1 of the hemispherical portion 70a contacts the lateral surface 65b, whereby the position of the photosensitive drum 1 relative to the apparatus main assembly 100A in terms of a direction perpendicular to the lengthwise direction of the photosensitive drum 1 is fixed; in other words, the photosensitive drum 1 is precisely positioned relative to the apparatus main assembly 100A in terms of the radial direction (of the photosensitive drum 1). Further, in terms of the lengthwise direction of the photosensitive drum 1, the hole 65 is positioned so that it overlaps with the hemispherical portion 70a, making it possible to reduce the dimension of the apparatus main assembly 100A in terms of the lengthwise direction of the photosensitive drum 1.

Figure 7:
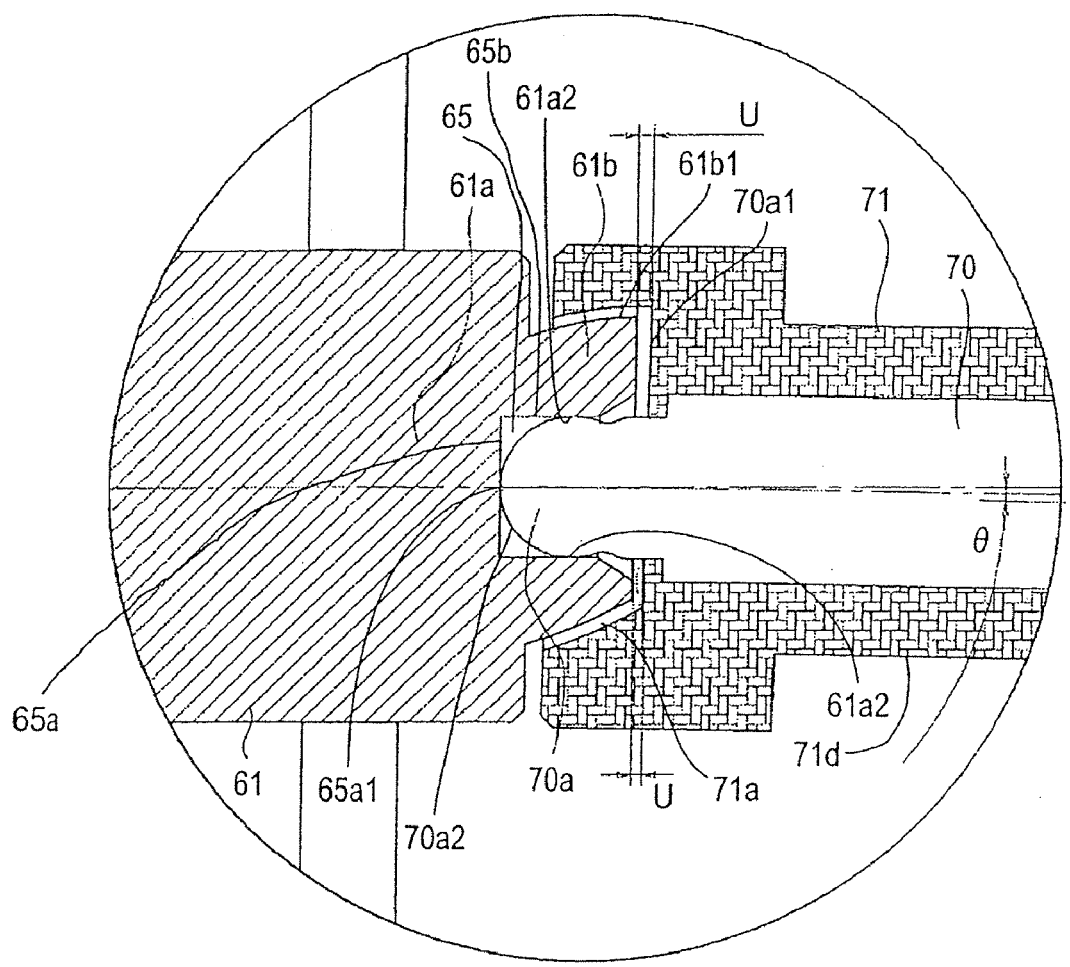
FIG. 7 is a sectional view of the drum driving force transmission mechanism in the preferred embodiment of the present invention.

Referring to FIG. 7, in this embodiment, the hole 71a is spiral, and its cross section is roughly triangular; it is preferred that the cross section of the hole 71a is roughly in the form of an equilateral triangle. The projection 61b is also spiral, and its cross section is also roughly triangular; it is preferred that the cross section of the projection 61b is roughly in the form of an equilateral triangle. It should be noted that when the cross sections of the hole 71a and projection 61b are roughly in the form of an equilateral triangle, the level of accuracy at which the axial lines of the hole 71a and projection 61b align with each other is much better than otherwise; in other words, the level of accuracy with which the axial lines of the driving gear 71 and photosensitive drum 1 align with each other is much better than otherwise.

In this embodiment, the hole 71a is in the form of a spiral hole, the cross section of which is roughly triangular, and the projection 61b is in the form of a spiral pillar, the cross section of which is also triangular. However, this embodiment is not intended to limit the scope of the present invention. That is, the configuration of the hole 71a may be different from the one in this embodiment, as long as the hole 71a is in the form of a spiral hole, the cross section of which is non-circular and has a plurality of apexes. Similarly, the configuration of the projection 61b may be different from the one in this embodiment, as long as the projection 61b is in the form of a spiral projection, the cross section of which is non-circular and has a plurality of apexes. In other words, as long as the projection 61b, which fits into the non-circular spiral hole, the cross section of which has a plurality of apexes, is such a non-circular spiral projection, the cross section of which has a plurality of apexes, the configuration of the projection 61b may be different from the one in this embodiment. With the hole 71a and projection 61b structured as described above, as the driving gear 71 is rotated while the projection 61b is in the hole 71a, the axial lines of the projection 61b and hole 71a align with each other in practical terms. In other words, as long as the projection 61b and hole 71a are structured so that the projection 61b receives the driving force from the apparatus main assembly 100A while remaining subjected to the force generated in the direction to draw the projection 61b into the hole 71a by the interface between the projection 61b and the lateral surface of the hole 71a, the configurations of the projection 61b and hole 71a do not need to be limited to those described above.

Figure 8:
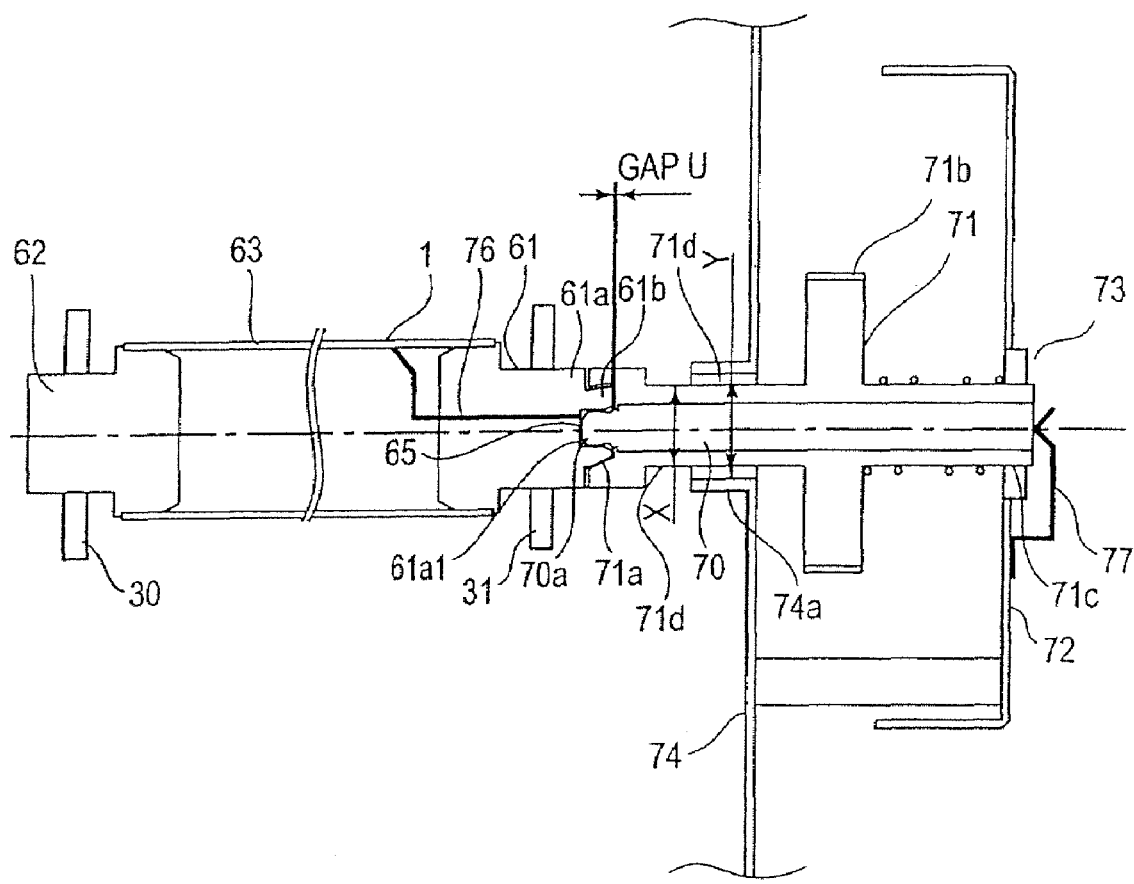
FIG. 8 is a sectional view of the drum driving force transmission mechanism in the preferred embodiment of the present invention.

Referring to FIGS. 6 and 8, the external diameter X of the shaft portion 71d of the driving gear 71 is set to be smaller than the internal diameter Y of the hole 74a of the supporting frame (supporting member) 74 (X<Y) (FIGS. 6 and 8). Therefore, the shaft portion 71d is allowed to move in the radial direction of the shaft 71d, within the hole 74a. While the photosensitive drum 1 is connected to the driving gear 71, that is, while the projection 61b is in the hole 71a, the driving gear 71 does not come into contact with the supporting member 74 of the apparatus main assembly 100A; in other words, the shaft portion 71d does not come into contact with the internal surface of the hole 74a. Therefore, the driving gear 71 smoothly rotates. Incidentally, while the projection 61b is not in contact with the internal surface of the hole 71a, the shaft portion 71d is in contact with the internal surface of the hole 74a; in other words, the shaft portion 71d is supported by the supporting frame (member) 74. The gear positioning portion 71c of the driving gear 71, that is, the portion which is positioned opposite to the photosensitive drum 1, is supported by the supporting frame 72 of the apparatus main assembly 100A, with a bearing 73 placed between the positioning portion 71c and supporting frame 72; in other words, it is supported by the supporting frame 72, with the provision of a minimum amount of a gap, between the positioning portion 71c and supporting frame 72 (bearing 73), necessary to allow the driving gear 71 to slide relative to the apparatus main assembly 100A. Therefore, while the aforementioned rotational driving force is transmitted, the position of the driving gear 71 relative to the photosensitive drum 1 remains fixed in terms of the radial direction of the photosensitive drum 1. In other words, the position of the driving gear 71 in terms of its radial direction is fixed as the position of the photosensitive drum 1 in terms of its radial direction becomes fixed. Further, as described above, the lengthwise ends of the photosensitive drum 1 are supported by the pair of bearings 30 and 31 with which the cartridge frame is provided. Therefore, the position of the photosensitive drum 1 in terms of its radial direction becomes fixed as its lengthwise ends are supported by the pair of bearings 30 and 31. Therefore, the axial line of the drive shaft 70 of the apparatus main assembly 100A, and the axial line of the photosensitive drum 1 coincide with each other. Incidentally, the drive shaft 70 is integrally attached to the driving gear 71, and the drive shaft 70 and the driving gear 71 are attached to the bearing 73 so that they do not move relative to the apparatus main assembly 100A in their axial directions. In comparison, the photosensitive drum 1 is supported by the bearings 30 and 31 so that it is allowed to move relative to the apparatus main assembly 100A in its axial direction.

Even if the photosensitive drum 1 and driving gear 71 are positioned relative to each other so that their axial lines coincide with each other, the axial line of the drive shaft 70 sometimes becomes slightly tilted relative to the axial line of the photosensitive drum 1, because of the tolerances of the components for supporting them. Hereafter, the angle of this tilt will be referred to as declination angle θ. Referring to FIG. 7, in this embodiment, the photosensitive drum 1 is precisely positioned by placing the tip (peak) 70a2 of the hemispherical portion 70a in contact with the bottom 65a of the hole 65, in terms of the lengthwise direction of the photosensitive drum 1. Therefore, as the tip (peak) 70a2 comes into contact with the bottom 65a, a gap U is always left between the end surface 61b1 of the projection 61b and the bottom 70a1 of the hole 71a. In this embodiment, it is ensured that even if the axial line of the drive shaft 70 slightly (at declination angle of θ) deviates from that of the photosensitive drum 1, the gap U always remains between the end surface 61b1 of the projection 61b and the bottom 70a1 of the hole 71a. Therefore, the tip (peak) 70a2 of the hemispherical portion 70a never fails to contact the bottom 65a of the hole 65. Therefore, even if the axial line of the driving gear 71 (drive shaft 70) tilts relative to the axial line of the photosensitive drum 1, the rotational velocity of the photosensitive drum 1 is not affected. In other words, in this embodiment, even if the axial line of the drive shaft 70 deviates by the declination angle θ, the rotational velocity of the photosensitive drum 1 does not become irregular. This is because the tip (peak) 70a2 of the hemispherical portion 70a and the bottom 65a of the hole 65 contact each other in such a manner that the contact point between them remains coincident with the axial line of the photosensitive drum 1. In other words, even if the axial line of the drive shaft 70 becomes tilted by the declination angle 8, the tip (peak) 70a2 contacts the bottom 65a so that the contact point between them coincides with the axial line of the photosensitive drum 1. Therefore, the photosensitive drum 1 of the cartridge 7 is prevented from becoming irregular in rotational velocity. Therefore, it is possible to prevent the occurrence of color deviation attributable to the irregularity in the rotational velocity of the photosensitive drum 1, when forming a full-color image.

Incidentally, designated by reference characters 71b is the actual gear portion of the driving gear 71. More specifically, the actual gear portion 71b is helical.

As described above, in this embodiment, the position of the photosensitive drum 1 relative to the apparatus main assembly 100A in terms of the axial direction of the photosensitive drum 1 is fixed by the force generated in the direction to draw the projection 61b into the hole 71a as the driving gear 71 is rotated after the projection 61b fits into the hole 71a. Further, the tip (peak) 70a2 of the hemispherical portion 70a is placed in contact with the bottom 65a of the hole 65. Therefore, even if the axial line of the driving gear 71 becomes tilted relative to the axial line of the photosensitive drum 1, the rotational velocity of the photosensitive drum 1 does not become irregular. Therefore, the photosensitive drum 1 of one cartridge 7 does not become different in rotation from the photosensitive drums 1 in the other cartridges 7. In other words, this embodiment makes it possible to precisely control the rotation of the photosensitive drum 1, making it possible to minimize the color deviation attributable to the irregularity in the rotation of the photo sensitive drum 1. Therefore, this embodiment can yield a color image of higher quality.

Figure 10:
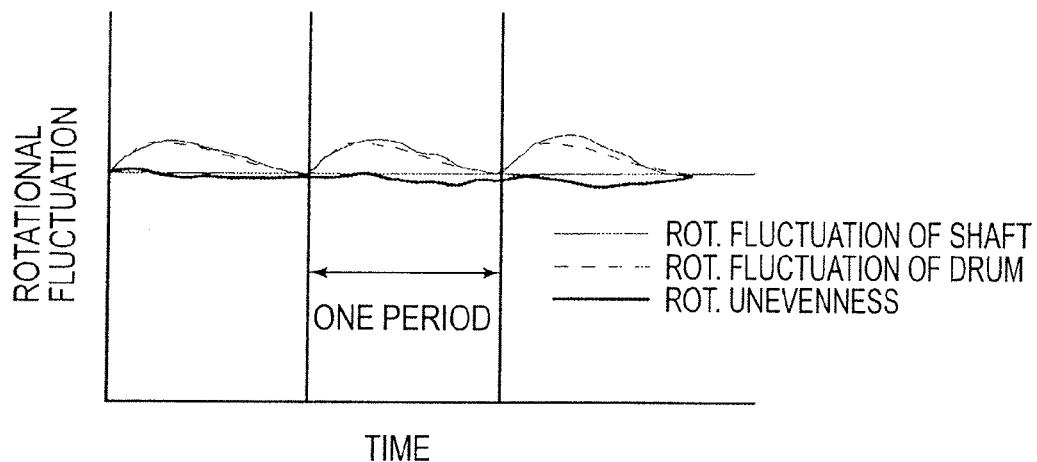
FIGS. 10($a$) and 10($b$) are graphs that provide data obtained by measuring the rotational velocities of the photosensitive drum in the preferred embodiment and a photosensitive drum in accordance with the prior art, respectively, in order to compare the preferred embodiment of the present invention with the embodiment of the prior art, in terms of an irregularity in the rotational velocity of a photosensitive drum.
Figure 10:
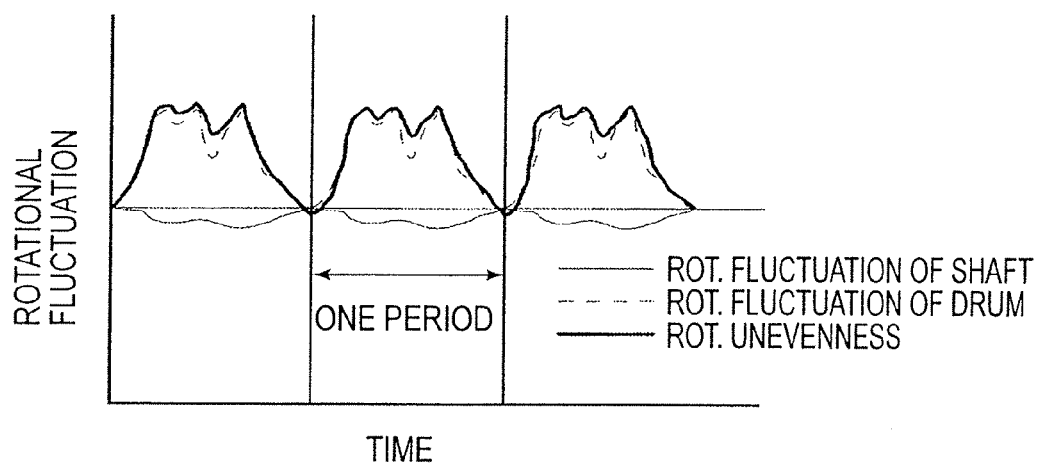

At this time, referring to FIG. 10, the results of the comparison between the above-described embodiment of the present invention, and a comparative example, will be described. FIG. 10 provides data for comparing the above-described embodiment of the present invention, and the comparative example, in terms of the irregularity in the rotation of the photosensitive drum. In the case of the comparative example, the structure for positioning the photosensitive drum relative to the apparatus main assembly in terms of the lengthwise direction of the photosensitive drum is such that the photosensitive drum is positioned relative to the apparatus main assembly by placing the flat bottom surface of the hole provided on the apparatus main assembly side, in contact with the flat end surface of the projection provided on the partridge side. The comparative example was tested, with the declination angle set to 0.3°. To compare the above-described embodiment of the present invention with the comparative example, the embodiment of the present invention was tested, with the declination angle set also to 0.3°. FIG. 10(a) shows the irregularity in the rotation of the photosensitive drum 1 in the above-described embodiment, and FIG. 10(b) shows the irregularity in the rotation of the photosensitive drum in the comparative example. In both figures, the ordinate axis represents the amount of the fluctuation in the rotational velocity of the photosensitive drum, and abscissas axis represents the elapsed time. As will be evident from these graphs, the photosensitive drum 1 in the embodiment of the present invention, the test results of which are given in FIG. 10(a), is smaller in the amount of the fluctuation in the rotational velocity per unit of time (per rotation) than the photosensitive drum in the comparative example, the test results of which are given in FIG. 10(b).

In other words, in the case of the embodiment of the present invention, even when the axial line of the driving gear 71 became tilted relative to the axial line of the photosensitive drum 1, the rotation of the photosensitive drum 1 did not become irregular. This is because the aforementioned tip (peak) contacted the aforementioned bottom in such a manner that the contact point between them was always coincident with the axial line of the photosensitive drum. In other words, even when the axial line of the driving gear 71 became tilted relative to the axial line of the photosensitive drum 1, the tip (peak) of the hemispherical portion contacted the aforementioned bottom at the axial line of the photosensitive drum 1.

Incidentally, when measuring the amount of the irregularity in the rotational velocity of the photosensitive drum, the amount of the torque applied to rotate the photosensitive drum 1 was set to 3 kgf cm, in order to match the amount of the torque applied for the test to the amount of the torque applied to rotate the photosensitive drum in an actual cartridge.

Next, referring to FIG. 8, the structural arrangement for grounding the photosensitive drum 1 to the apparatus main assembly 100A through the hemispherical portion 70a will be described. The other structural arrangements are the same as those described above, and therefore, their description given above is to be referred to for the descriptions of the structural arrangements other than that for the grounding structure.

The drive shaft 70 and hemispherical portion 70a are made electrically conductive, and one end of a contacting member 77 is placed in contact with the rear end of the driving shaft 70, as shown in FIG. 8, and the other end of the contacting member 77 is attached to the supporting frame 72. The contacting member 77 and supporting frame 72 are formed of metallic plates and are electrically conductive. Therefore, the hemispherical portion 70a, the drive shaft 70, the contacting member 77, and the supporting frame 72 are electrically connected. Further, in this embodiment, the bottom 65a of the hole 65 (FIG. 8) is covered with one end of a piece of an electrically conductive metallic plate (photosensitive drum grounding contact) 76, the other end of the which is electrically connected to the electrically conductive cylinder 63 of the photosensitive drum 1. In other words, within the hole 65, one end of the metallic plate 76, as a grounding contact, electrically connected to the cylinder 63, is positioned in a manner to cover the bottom 65a of the hole 65, so that as the projection 61b fits into the hole 71a and receives from the apparatus main assembly 100A the force for rotationally driving the photosensitive drum 1, the hemispherical portion 70a is pressed on the metallic grounding plate 76 by the aforementioned force generated in the direction to draw the projection 61b into the hole 71a. In other words, this metallic grounding plate 76 comes into contact with the tip (peak) 70a2 of the hemispherical portion 70a, when the cartridge 7 is in the apparatus main assembly 100A. Further, the one end of the metallic grounding plate 76, which covers the bottom 65a of the hole 65, and with which the tip (peak) 70a2 comes into contact, is flat. Therefore, while the rotational force is transmitted to the photosensitive drum 1, with the projection 61b being in the hole 71a, the photosensitive drum 1 remains electrically connected to the apparatus main assembly 100A through the grounding metallic plate 76, the hemispherical portion 70a, the drive shaft 70, the contacting member 77, and the supporting frame 72, because while the rotational force is transmitted to the photosensitive drum 1 from the apparatus main assembly 100A, the aforementioned force generated in the direction to draw the projection 61b into the hole 71a keeps the hemispherical portion 70a pressed upon the metallic grounding plate 76, ensuring that the hemispherical portion 70a and metallic grounding plate 76 remain electrically connected. In addition, the resiliency of the hemispherical portion 70a keeps the metallic grounding plate 76 resiliently connected to the hemispherical portion 70a, also ensuring that the two remain electrically connected. Therefore, the photosensitive drum 1 is reliably grounded and remains grounded.

With the provision of the above-described structural arrangement, the point of the hemispherical portion 70a, by which the hemispherical portion 70a contacts the metallic grounding plate 76 (and vice versa), that is, by which the hemispherical portion 70a keeps the photosensitive drum 1 electrically connected to the drive shaft 70, does not slide on the metallic grounding plate 76; in other words, it remains in contact with only a single spot of the metallic grounding plate 76. This is because the photosensitive drum 1 and the drive shaft 70 rotate together. Therefore, it is ensured that the cartridge 7 removably mountable in the apparatus main assembly 100A is electrically connected, and remains connected, to the apparatus main assembly 100A.

Further, the force generated in the direction to draw the projection 61b into the hole 71a during the transmission of the rotational driving force is utilized as the pressure to keep the hemispherical portion 70a pressed on the metallic grounding plate 76. Therefore, a user does not need to be concerned about the fatigue of the components through which the photosensitive drum 1 is grounded. Further, the contact pressure is generated only during the transmission of the rotational driving force, and the force which works in the direction to draw the projection 61b into the hole 71a is not generated (projection drawing force is turned off) while the driving force is not transmitted; it is generated (projection drawing force is turned on) only during the transmission of the driving force. Thus, as the projection drawing force is turned on or off, the slight misalignment occurs between the axial lines of the photosensitive drum 1 and drive shaft 70, and this misalignment has the effect of causing the hemispherical portion 70a and metallic grounding plate 76 to wipe each other.

Further, referring to FIG. 5, the hole 65 is shaped so that its cross section perpendicular to the axial line of the hole 65 becomes circular, minimizing the amount of the space necessary for the hole 65. Therefore, it is possible to reduce the size of the projection 61b without reducing the projection 61b in strength. Accordingly, it is possible to reduce size the hole 71a into which the projection 61b fit, making it therefore possible to reduce in size the main assembly 100A of the image forming apparatus.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Applications Nos. 140695/2004 and 283318/2004 filed May 11, 2004 and Sep. 29, 2004, respectively, which is hereby incorporated by reference.

What is claimed is:

1. An electrophotographic photosensitive drum for a process cartridge detachably mountable to a main assembly of an electrophotographic image forming apparatus for forming an image on a recording material, the main assembly including a motor, a main assembly gear configured and positioned to transmit a driving force from the motor, and a non-circular twisted hole having a section with a plurality of corner portions provided at a central portion of the main assembly gear, the non-circular twisted hole being rotatable integrally with the main assembly gear, said electrophotographic photosensitive drum comprising:

(a) a cylinder having a photosensitive layer on a peripheral surface thereof; and
    (b) a non-circular twisted projection provided on one longitudinal end of said cylinder and having a section with a plurality of corner portions, said non-circular twisted projection being engageable with the hole of the main assembly of the apparatus to receive a rotational driving force for rotating said electrophotographic photosensitive drum from the main assembly of the apparatus when said process cartridge is mounted to the main assembly of the apparatus,
    wherein a recess is formed in a central portion of said projection and has a bottom portion and a side surface portion,
    wherein in a state that said projection receives a pulling force toward the hole by rotation of the main assembly gear with said projection and the hole being engaged with each other, said bottom portion contacts a spherical surface portion provided at a central portion of the hole, and said side surface portion contacts the spherical surface portion, and
    wherein when the process cartridge is mounted to the main assembly of the apparatus, and said electrophotographic photosensitive drum receives the rotational driving force for rotating said electrophotographic photosensitive drum from the main assembly of the apparatus, an end of the spherical surface portion contacts said bottom portion, and the spherical surface portion contacts said side surface portion in a state that said projection receives the pulling force and that gaps are provided between a free end of said projection and an inner surface of the hole and between a side surface of said projection and the inner surface of the hole.

2. An electrophotographic photosensitive drum according to claim 1,
    wherein the spherical surface portion is electroconductive and is electrically connected with the main assembly of the apparatus,
    wherein said electrophotographic photosensitive drum further comprises a grounding contact in said recess,
    wherein said grounding contact is electrically connected with said cylinder and is positioned at said bottom portion, and
    wherein said grounding contact is urged to the spherical surface portion by a pulling force when said electrophotographic photosensitive drum receives the rotational driving force from the main assembly of the apparatus through engagement of said projection with the hole.

3. An electrophotographic photosensitive drum according to claims 1 or 2, wherein said recess has a circular section.

4. An electrophotographic photosensitive drum according to claim 3, wherein the end of the spherical surface portion contacts a flat surface portion of said bottom portion.

5. A process cartridge detachably mountable to a main assembly of an electrophotographic image forming apparatus for forming an image on a recording material, the main assembly including a motor, a main assembly gear configured and positioned to transmit a driving force from the motor, and a non-circular twisted hole having a section with a plurality of corner portions provided at a central portion of the main assembly gear, the non-circular twisted hole being rotatable integrally with the main assembly gear, said process cartridge comprising:

(a) an electrophotographic photosensitive drum;
    (b) process means actable on said electrophotographic photosensitive drum; and
    (c) a non-circular twisted projection provided on one longitudinal end of said electrophotographic photosensitive drum and having a section with a plurality of corner portions, said non-circular twisted projection being engageable with the hole of the main assembly of the apparatus to receive a rotational driving force for rotating said electrophotographic photosensitive drum from the main assembly of the apparatus when said process cartridge is mounted to the main assembly of the apparatus,
    wherein a recess is formed in a central portion of said projection and has a bottom portion and a side surface portion substantially perpendicular to said bottom portion,
    wherein in a state that said projection receives a pulling force toward the hole by rotation of the main assembly gear with said projection and the hole being engaged with each other, said bottom portion contacts a spherical surface portion provided at a central portion of the hole, and said side surface portion contacts the spherical surface portion, and
    wherein when said process cartridge is mounted to the main assembly of the apparatus, and said electrophotographic photosensitive drum receives the rotational driving force for rotating said electrophotographic photosensitive drum from the main assembly of the apparatus, an end of the spherical surface portion contacts said bottom portion, and the spherical surface portion contacts said side surface portion in a state that said projection receives the pulling force and gaps are provided between a free end of said projection and an inner surface of the hole and between a side surface of said projection and the inner surface of the hole.

6. A process cartridge according to claim 5,
wherein the spherical surface portion is electroconductive and is electrically connected with the main assembly of the apparatus,
wherein said electrophotographic photosensitive drum further comprises a grounding contact in said recess, said grounding contact being electrically connected with a cylinder of said electrophotographic photosensitive drum and being positioned at said bottom portion, said grounding contact being urged to the spherical surface portion by a pulling force when said electrophotographic photosensitive drum receives the rotational driving force from the main assembly of the apparatus through engagement of said projection with the hole.

7. A process cartridge according to claims 5 or 6, wherein said recess has a circular section.

8. A process cartridge according to claim 7, wherein the end of the spherical surface portion contacts a flat surface portion of said bottom portion.

9. An electrophotographic image forming apparatus for forming an image on a recording material, said electrophotographic image forming apparatus comprising:
(a) a motor;
(b) a main assembly gear configured and positioned to transmit a driving force from said motor;
(c) a non-circular twisted hole is provided in a central portion of said main assembly gear and having a section with a plurality of corner portions, said non-circular twisted hole being rotatable with said main assembly gear;
(d) a spherical portion provided in a central portion of said non-circular twisted hole;
(e) a mounting portion in a main assembly of said apparatus; and
(f) a process cartridge detachably mounted to said mounting portion, said process cartridge including:
an electrophotographic photosensitive drum;
process means actable on said electrophotographic photosensitive drum;
a non-circular twisted projection provided on one longitudinal end of said electrophotographic photosensitive drum and having a section with a plurality of corner portions, said non-circular twisted projection being engageable with said hole to receive a rotational driving force from said main assembly of said apparatus when said process cartridge is mounted to said mounting portion of said main assembly of said apparatus,
wherein a recess is formed in a central portion of said projection and has a bottom portion and a side surface portion substantially perpendicular to said bottom portion,
wherein in a state that said hole receives a pulling force toward said projection by rotation of said main assembly gear with said projection and said hole being engaged with each other, said bottom portion contacts an end of said spherical surface portion, and said side surface portion contacts said spherical surface portion; and
(g) feeding means for feeding the recording material,
wherein when said process cartridge is mounted to said main assembly of said apparatus, and said electrophotographic photosensitive drum receives the rotational driving force for rotating said electrophotographic photosensitive drum from said main assembly of said apparatus, the end of said spherical surface portion contacts said bottom portion, and said spherical surface portion contacts said side surface portion in a state that said projection receives the pulling force and gaps are provided between a free end of said projection and an inner surface of said hole and between a side surface of said projection and the inner surface of said hole.

10. An apparatus according to claim 9,
wherein said spherical surface portion is electroconductive and is electrically connected with said main assembly of said apparatus,
wherein said process cartridge has a grounding contact in the recess,
wherein said grounding contact is electrically connected with a cylinder of said electrophotographic photosensitive drum and comprises said bottom portion, and is urged to said spherical surface portion by a pulling force when said electrophotographic photosensitive drum receives the driving force from said main assembly of said apparatus through engagement of said projection with said hole.

11. An apparatus according to claims 9 or 10, wherein said electrophotographic image forming apparatus is a full color electrophotographic image forming apparatus capable of receiving a plurality of said process cartridges.

* * * * *